United States Patent
Ahrenholz et al.

(10) Patent No.: US 10,797,993 B2
(45) Date of Patent: *Oct. 6, 2020

(54) OVERLAY NETWORK IDENTITY-BASED RELAY

(71) Applicant: Tempered Networks, Inc., Seattle, WA (US)

(72) Inventors: Jeffrey Michael Ahrenholz, Mercer Island, WA (US); Orlie Thomas Brewer, Jr., Bothell, WA (US); Jeff James Costlow, Bellevue, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,166

(22) Filed: Feb. 4, 2019

(65) Prior Publication Data

US 2020/0007443 A1    Jan. 2, 2020

Related U.S. Application Data

(63) Continuation of application No. 16/120,043, filed on Aug. 31, 2018, now Pat. No. 10,200,281, which is a
(Continued)

(51) Int. Cl.
*H04L 12/715* (2013.01)
*H04L 12/751* (2013.01)
*H04L 12/741* (2013.01)

(52) U.S. Cl.
CPC .......... *H04L 45/64* (2013.01); *H04L 45/026* (2013.01); *H04L 45/74* (2013.01)

(58) Field of Classification Search
None
See application file for complete search history.

(56) References Cited

U.S. PATENT DOCUMENTS

| 5,835,727 A | 11/1998 | Wong et al. |
| 6,981,156 B1 | 12/2005 | Stern et al. |

(Continued)

FOREIGN PATENT DOCUMENTS

| WO | 2007038872 A1 | 4/2007 |
| WO | 2008039506 A2 | 4/2008 |

OTHER PUBLICATIONS

Asguard Networks, Inc., "SimpleConnectTM Product Information," Retrieved on Nov. 9, 2012, from http://www.asguardnetworks.com/product, 1 page.

(Continued)

*Primary Examiner* — Otis L Thompson, Jr.
(74) *Attorney, Agent, or Firm* — John W. Branch; Branch Partners PLLC

(57) ABSTRACT

Embodiments are directed to a relay that receives packets from a source gateway associated with a source gateway identifier (GID) and a target GID associated with a target gateway where each GID is separate from a network address or a hostname of the source gateway or the target gateway. The relay determines a connection route based on an association between the connection route and an ingress identifier obtained from the packets. The relay provides the connection route based on the source GID and the target GID. The relay determines network address information associated with the target gateway based on the connection route. And, the relay forwards the packets provided by the source gateway to the target gateway based on the network address information.

20 Claims, 10 Drawing Sheets

Related U.S. Application Data continuation of application No. 15/924,148, filed on Mar. 16, 2018, now Pat. No. 10,069,726.

(56) References Cited

U.S. PATENT DOCUMENTS

| | | | |
|---|---|---|---|
| 7,209,956 B2 | 4/2007 | Mache | |
| 7,324,533 B1 | 1/2008 | DeLiberato et al. | |
| 7,373,660 B1 | 5/2008 | Guichard et al. | |
| 7,395,349 B1 | 7/2008 | Szabo et al. | |
| 7,796,593 B1 | 9/2010 | Ghosh et al. | |
| 7,881,199 B2 | 2/2011 | Krstulich | |
| 7,996,894 B1 | 8/2011 | Chen et al. | |
| 8,224,971 B1 | 7/2012 | Miller et al. | |
| 8,429,400 B2 | 4/2013 | Khalid et al. | |
| 8,489,701 B2 | 7/2013 | Manion et al. | |
| 8,607,301 B2 | 12/2013 | Carrasco | |
| 8,630,183 B2* | 1/2014 | Miyata | H04L 12/2856 370/236 |
| 8,832,211 B1* | 9/2014 | Lebedev | H04L 12/1822 709/206 |
| 8,886,827 B2 | 11/2014 | Goel et al. | |
| 8,959,513 B1 | 2/2015 | Swaminathan | |
| 9,264,522 B1 | 2/2016 | Reeves et al. | |
| 10,158,545 B1 | 12/2018 | Marrone et al. | |
| 2002/0026532 A1 | 2/2002 | Maeda et al. | |
| 2002/0073182 A1 | 6/2002 | Zakurdaev et al. | |
| 2002/0143855 A1 | 10/2002 | Traversat et al. | |
| 2003/0061479 A1 | 3/2003 | Kimura | |
| 2003/0081620 A1 | 5/2003 | Danner et al. | |
| 2003/0123436 A1* | 7/2003 | Joseph | H04L 12/2856 370/352 |
| 2004/0143628 A1 | 7/2004 | Bradford et al. | |
| 2004/0268121 A1 | 12/2004 | Shelest et al. | |
| 2005/0014500 A1* | 1/2005 | Muhonen | H04W 64/00 455/433 |
| 2005/0052999 A1 | 3/2005 | Oliver et al. | |
| 2005/0265355 A1 | 12/2005 | Havala et al. | |
| 2006/0190458 A1 | 8/2006 | Mishina et al. | |
| 2007/0019641 A1 | 1/2007 | Pai et al. | |
| 2007/0081530 A1 | 4/2007 | Nomura et al. | |
| 2007/0226781 A1 | 9/2007 | Chen et al. | |
| 2007/0230352 A1 | 10/2007 | Kokku et al. | |
| 2007/0258440 A1 | 11/2007 | Watanabe | |
| 2008/0072282 A1 | 3/2008 | Willis et al. | |
| 2008/0082823 A1 | 4/2008 | Starrett et al. | |
| 2008/0151916 A1 | 6/2008 | Jetcheva et al. | |
| 2008/0232360 A1* | 9/2008 | Mihaly | H04L 47/20 370/389 |
| 2008/0288614 A1 | 11/2008 | Gil et al. | |
| 2008/0307519 A1 | 12/2008 | Curcio et al. | |
| 2009/0010168 A1* | 1/2009 | Yurchenko | H04L 12/66 370/237 |
| 2009/0034738 A1 | 2/2009 | Starrett | |
| 2009/0059906 A1* | 3/2009 | Cullen | H04L 12/2859 370/352 |
| 2009/0129374 A1 | 5/2009 | Yurchenko et al. | |
| 2009/0210518 A1 | 8/2009 | Verma et al. | |
| 2009/0310518 A1 | 12/2009 | Jayaram et al. | |
| 2010/0014533 A1 | 1/2010 | Hirano et al. | |
| 2010/0024026 A1 | 1/2010 | Ylonen et al. | |
| 2010/0027442 A1 | 2/2010 | Chockler et al. | |
| 2010/0042747 A1 | 2/2010 | Hascalovici et al. | |
| 2010/0214959 A1 | 8/2010 | Kuehnel et al. | |
| 2010/0218235 A1 | 8/2010 | Ganot | |
| 2010/0254395 A1 | 10/2010 | Smith et al. | |
| 2011/0016509 A1 | 1/2011 | Huang et al. | |
| 2011/0035466 A1 | 2/2011 | Panirahi | |
| 2011/0090892 A1 | 4/2011 | Cooke | |
| 2011/0103393 A1 | 5/2011 | Meier et al. | |
| 2011/0141881 A1 | 6/2011 | Joshi et al. | |
| 2012/0110203 A1 | 5/2012 | Ozawa | |
| 2012/0163196 A1 | 6/2012 | Jansen et al. | |
| 2012/0304243 A1 | 11/2012 | Li et al. | |
| 2013/0018993 A1 | 1/2013 | Hui et al. | |
| 2013/0083725 A1 | 4/2013 | Mallya et al. | |
| 2013/0198830 A1 | 8/2013 | Nemoto et al. | |
| 2013/0254264 A1 | 9/2013 | Hankinson et al. | |
| 2013/0283364 A1 | 10/2013 | Chang et al. | |
| 2014/0026207 A1* | 1/2014 | Wang | H04L 41/28 726/12 |
| 2014/0133354 A1 | 5/2014 | Scharf et al. | |
| 2014/0150070 A1 | 5/2014 | Peterson | |
| 2014/0223507 A1 | 8/2014 | Xu | |
| 2014/0282817 A1 | 9/2014 | Singer et al. | |
| 2014/0282850 A1 | 9/2014 | Mattes et al. | |
| 2014/0307744 A1 | 10/2014 | Dunbar et al. | |
| 2014/0348131 A1 | 11/2014 | Duan et al. | |
| 2015/0024677 A1 | 1/2015 | Gopal et al. | |
| 2015/0046997 A1 | 2/2015 | Gupta et al. | |
| 2015/0057766 A1* | 2/2015 | Ejiri | G05B 15/02 700/14 |
| 2015/0067033 A1 | 3/2015 | Martinsen et al. | |
| 2015/0124823 A1 | 5/2015 | Pani et al. | |
| 2015/0135259 A1 | 5/2015 | Ilyadis et al. | |
| 2015/0281074 A1* | 10/2015 | Kubota | H04L 45/745 370/315 |
| 2015/0365316 A1* | 12/2015 | Liao | H04L 12/4633 709/223 |
| 2015/0372828 A1* | 12/2015 | Hao | H04L 12/18 370/390 |
| 2016/0028624 A1* | 1/2016 | Song | H04L 12/4633 370/392 |
| 2016/0036861 A1 | 2/2016 | Mattes et al. | |
| 2016/0149804 A1* | 5/2016 | Mirza | H04L 45/24 370/392 |
| 2016/0261641 A1 | 9/2016 | Mattes et al. | |
| 2017/0238215 A1* | 8/2017 | Jin | H04W 36/18 370/331 |
| 2018/0083968 A1* | 3/2018 | Xu | H04L 41/5041 |
| 2019/0394107 A1 | 12/2019 | Marrone et al. | |

OTHER PUBLICATIONS

Asguard Networks, Inc., "Welcome to Asguard Networks," Retrieved on Oct. 23, 2012, from http://www.asguardnetworks.com/, 1 page.

Asguard Networks, Inc., "SimpleConnectTM Quick Start Documentation Guide," Revision 1, Dec. 13, 2012, pp. 1-18.

Henderson, T. et al., "HIP-based Virtual Private LAN Service (HIPLS)," Network Working Group, Internet-Draft, The Boeing Company, Nov. 6, 2012, pp. 1-16.

International Search Report and Written Opinion for International Patent Application No. PCT/US2014/023632 dated Jun. 23, 2014, pp. 1-13.

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news, pp. 1-2.

Trusted Computing Group, Incorporated, "TCG Trusted Network Connect: IF-MAP Metadata for ICS Security," Specification Version 1.0, Revision 44, May 8, 2014, pp. 1-64.

Office Communication for U.S. Appl. No. 14/740,053 dated Jul. 29, 2015, pp. 1-10.

Office Communication for U.S. Appl. No. 14/204,907 dated Jul. 10, 2015, pp. 1-20.

Aoyagi, S. et al., "ELA: A Fully Distributed VPN System Over Peer-to-Peer Network," Proceedings of the 2005 Symposium on Applications and the Internet, 2005, IEEE, Computer Society; pp. 1-4.

Benyamina, D. et al., "Wireless Mesh Networks Design—A Survey," IEEE Communications Survey & Tutorials, vol. 14, No. 2, Second Quarter 2012, pp. 299-310.

International Search Report and Written Opinion for International Patent Application No. PCT/US2015/042993 dated Nov. 11, 2015, pp. 1-11.

Office Communication for U.S. Appl. No. 14/204,907 dated Dec. 2, 2015, pp. 1-14.

Official Communication for U.S. Appl. No. 15/156,254 dated Aug. 3, 2016, pp. 1-13.

(56) References Cited

OTHER PUBLICATIONS

Trusted Computing Group (Architects Guide; ICS Security Using TNC Technology, Oct. 2013, pp. 1-6.
Official Communication for U.S. Appl. No. 15/083,214 dated Oct. 25, 2016, pp. 1-11.
Office Communication for U.S. Appl. No. 14/740,053 dated Jan. 21, 2016, pp. 1-18.
Office Communication for U.S. Appl. No. 14/204,907 dated Feb. 24, 2016, pp. 1-20.
Official Communication for U.S. Appl. No. 15/083,214 dated Jul. 7, 2016, pp. 1-11.
Official Communication for U.S. Appl. No. 15/201,063 dated Nov. 2, 2016, pp. 1-11.
Official Communication for U.S. Appl. No. 15/156,254 dated Dec. 30, 2016, pp. 1-13.
Official Communication for U.S. Appl. No. 15/083,214 dated Jan. 9, 2017, pp. 1-5.
Official Communication for U.S. Appl. No. 15/156,254 dated May 5, 2017, pp. 1-13.
Official Communication for U.S. Appl. No. 15/083,214 dated Feb. 9, 2017, pp. 1-10.
Official Communication for U.S. Appl. No. 14/814,283 dated Jun. 9, 2017, pp. 1-18.
Official Communication for U.S. Appl. No. 15/201,063 dated Apr. 21, 2017, pp. 1-14.
Official Communication for U.S. Appl. No. 14/814,283 dated Nov. 30, 2015, pp. 1-8.
Official Communication for U.S. Appl. No. 14/814,283 dated Jun. 3, 2016, pp. 1-10.
Official Communication for U.S. Appl. No. 14/814,283 dated Aug. 23, 2016, pp. 1-7.
Official Communication for U.S. Appl. No. 14/814,283 dated Nov. 21, 2016, pp. 1-10.
Official Communication for U.S. Appl. No. 15/156,254 dated Oct. 19, 2017, pp. 1-13.
Lawton, "Machine-to-Machine Technology gears up for growth", 2004, pp. 12-15, IEEE Computer Society, pp. 1-4.
Official Communication for U.S. Appl. No. 15/670,925 dated Apr. 5, 2018, pp. 1-10.
Official Communication for U.S. Appl. No. 15/156,254 dated May 14, 2018, pp. 1-17.
Official Communication for U.S. Appl. No. 15/670,859 dated Jun. 29, 2018, pp. 1-29.
Official Communication for U.S. Appl. No. 15/924,148 dated Jun. 5, 2018, pp. 1-24.
Official Communication for U.S. Appl. No. 15/987,762 dated Sep. 12, 2018, pp. 1-24.
Official Communication for U.S. Appl. No. 15/994,760 dated Oct. 1, 2018, pp. 1-22.
Official Communication for U.S. Appl. No. 15/670,859 dated Nov. 26, 2018, pp. 1-20.
Office Communication for U.S. Appl. No. 14/814,283 dated Aug. 23, 2016, pp. 1-9.
Office Communication for U.S. Appl. No. 16/562,258 dated Oct. 22, 2019, pp. 1-10.
Official Communication for U.S. Appl. No. 16/172,621 dated Mar. 17, 2020, pp. 1-7.
Official Communication for U.S. Appl. No. 16/221,145 dated Apr. 13, 2020, pp. 1-7.
Official Communication for U.S. Appl. No. 16/562,258 dated Apr. 7, 2020, pp. 1-10.

* cited by examiner

| Gateway A Public Key | Gateway B Public Key |
|---|---|
| MIICWgIBAAKBg... | QpEzu0GmHTv8... |
| MIICWgIBAAKBg... | OzXeYrzf7EY+Dtb... |
| OzXeYrzf7EY+Dtb... | QpEzu0GmHTv8... |
| xPu85qKH2h4bU4... | xPu85qKH2h4bU4... |
| OzXeYrzf7EY+Dtb... | ZyILWWb9ZH/tqt... |
| ... | ... |

| Gateway A GID | Gateway B GID |
|---|---|
| 0x23fd7a39153cab91 | 0x354cb98e4fa65002 |
| 0x23fd7a39153cab91 | 0x8653af6462b7ad54 |
| 0x8653af6462b7ad54 | 0x354cb98e4fa65002 |
| 0x23fd7a39153cab91 | 0x35c2f154d36645a7 |
| 0x8653af6462b7ad54 | 0x9eb484e6261e8689 |
| ... | ... |

| Ingress Identifier A 704 | Gateway A GID 706 | Gateway A Network Address 708 | Ingress Identifier B 710 | Gateway B GID 712 | Gateway B Network Address 714 |
|---|---|---|---|---|---|
| 524 | 0x23fd7a39153cab91 | 12.34.56.78:31401 | 62588 | 0x354cb98e4fa65002 | 98.76.54.32:12304 |
| 123 | 0x23fd7a39153cab91 | 12.34.56.78:31401 | 254 | 0x8653af6462b7ad54 | 22.33.44.55:24651 |
| 736 | 0x8653af6462b7ad54 | 22.33.44.55:24651 | 657 | 0x354cb98e4fa65002 | 98.76.54.32:12304 |
| 951 | 0x23fd7a39153cab91 | 12.34.56.78:31401 | 2 | 0x35c2f154l3664 5a7 | 3.4.5.6:10789 |
| 7534 | 0x8653af6462b7ad54 | 22.33.44.55:24651 | 357 | 0x8eb484e6261e8689 | 4.5.6.7:1089 |
| ... | ... | ... | ... | ... | ... |

OVERLAY NETWORK IDENTITY-BASED RELAY

CROSS-REFERENCE TO RELATED APPLICATION(S)

This Utility Patent Application is a Continuation of U.S. patent application Ser. No. 16/120,043 filed on Aug. 31, 2018, now U.S. Pat. No. 10,200,281 issued on Feb. 5, 2019, which is a Continuation of U.S. patent application Ser. No. 15/924,148 filed on Mar. 16, 2018, now U.S. Pat. No. 10,069,726 issued on Sep. 4, 2018, the benefit of which is claimed under 35 U.S.C. § 120, and the contents of which are each further incorporated in entirety by reference.

TECHNICAL FIELD

The present invention relates generally to network management, and more particularly, but not exclusively, to managing communication over a network in which host identity is distinct from its topological location on a network.

BACKGROUND

Typical network communication protocols, such as, Internet Protocol (IP) deliver network packets from a source host to a destination host based on an IP address. Traditionally, IP addresses have served a dual purpose as a host's identity and location. This has led to challenges securing the various hosts and networks in modern distributed networking environments.

For instance, network packets often include a source network address that may be used by the target host to address and route return packets. However, in some cases target hosts may use the source network address to determine the identity of the source host. In some cases, this dual use may cause networks or services to be vulnerable to man-in-the-middle attacks based on network packets that include false or spoofed network addresses. Other security challenges enabled in part by this dual role of network addresses may include denial of service attacks, replay attacks, or the like. Also, since modern computing environments often employ ephemeral and/or non-unique network addresses, using network address to provide host identity poses challenges, as modern hosts, e.g. cell phones, frequently change location on the network. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein:

FIG. 6 illustrates a portion of a policy for defining connection routes allowed between pairs of gateway computers in accordance with one or more of the various embodiments;

FIG. 7 illustrates connection information for accumulating at least some of the information that enables overlay network identity-based relay between gateway computers in accordance with one or more of the various embodiments;

DETAILED DESCRIPTION OF THE EMBODIMENTS

Figure 1:
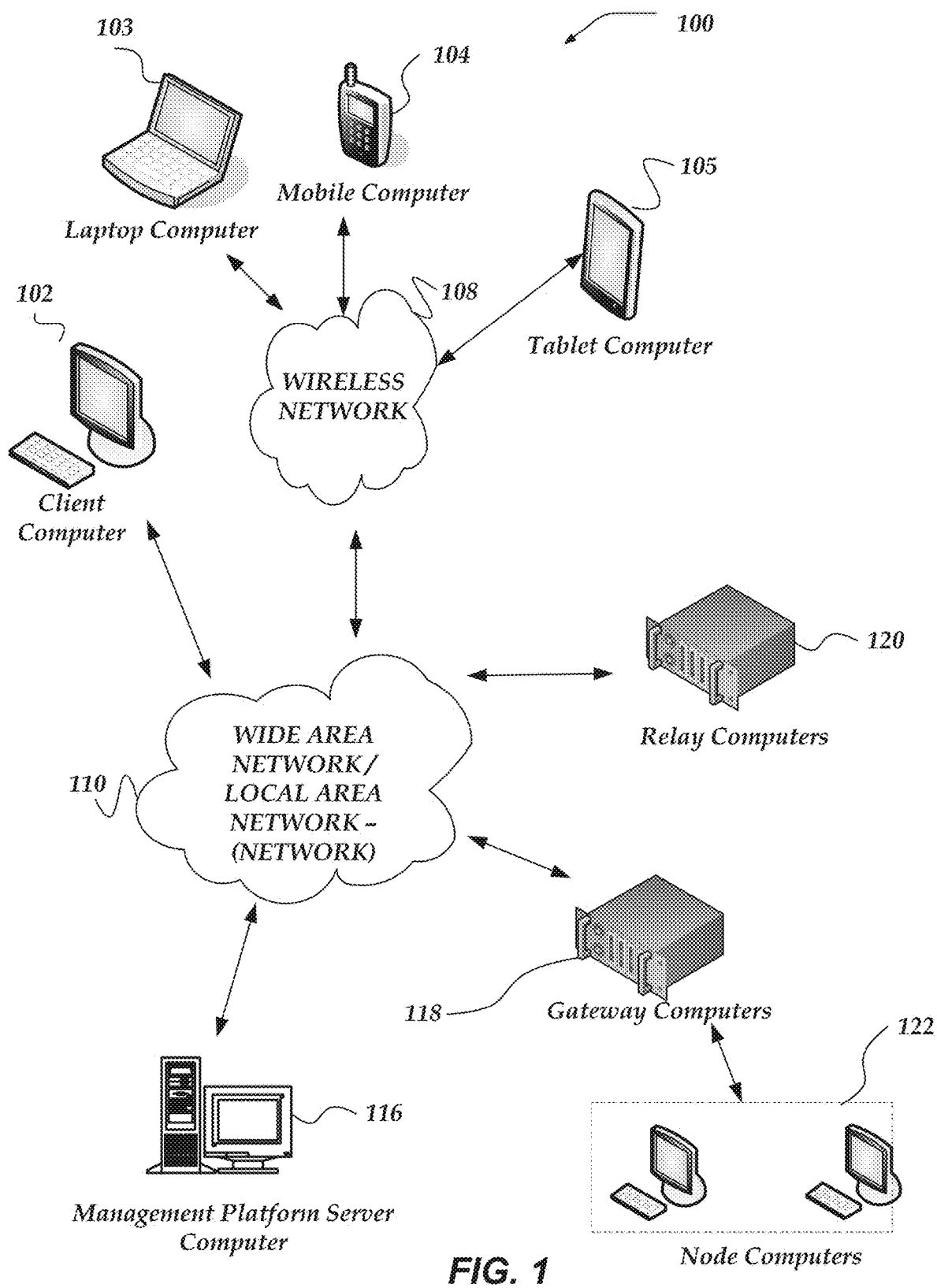
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. Phrases, such as, "in one embodiment," "in one or more embodiments, "some embodiments," "in one or more of the various embodiments," or the like, as used herein do not necessarily refer to the same embodiment, though it may. Furthermore, phrases, such as, "in one embodiment," "in one or more embodiments, "some embodiments," "in one or more of the various embodiments," or the like, as used herein do not necessarily refer to a different embodiment, although it may. Thus, as described below, various embodiments may be readily combined, without departing from the scope or spirit of the invention. Similarly, phrases, such as, "in one or more embodiments, "some embodiments," "in one or more of the various embodiments", or the like.

In addition, as used herein, the term "or" is an inclusive "or" operator, and is equivalent to the term "and/or," unless the context clearly dictates otherwise. The term "based on"

is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the terms "mesh network," "industrial network" refer to a network of industrial computer/machines, workstations, client computers, gateway computers, or the like. The term mesh network used herein describes both the typical network topology of a network in an industrial operation environment as well as more generally, a networked system used to perform operations in an industrial environment, such as, as factory floor, manufacturing complex, oil refinery, or the like. In the interest of clarity such networks (including machines and computers on the network) are referred to as mesh networks even when their topology and/or configuration is not strictly a "mesh" network and/or partial "mesh" network.

As used herein the term "physical network" refers to the actual communication network that interconnects one or more computers or networks. The physical network may be a physical or native network device/components used to connect one or more computers or industrial devices (machines) in a network. Physical networks include network interfaces, wire, wireless hotspots, switches, routers, repeaters, or the like, that comprise the physical network Also, physical networks may be considered to include the native communication protocols, network topology, and so on, that may be used to setup a mesh network in various environments. In some cases, physical networks may be arranged to enable open communication between node computers, (e.g., machines, workstations, client computers, and so on), gateway computers, management platform computers, relay computers, or the like, that are on the physical network.

As used herein the terms "node," and "node computer" refer to computers that are endpoint computers interconnected over a physical network. Node computers may include client computers, smart phones, video cameras, sensors, network computers, industrial workstations, press machines, robots, packaging machines, automated milling machines, automated printing presses, pumps, valves, boilers, or the like. Node computers are considered to be computers or devices connected to the physical network exclusive of gateway computers, relay computers, management platform server computers, or the like. Nodes gain access to the networks managed management platform via gateway computers As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/mesh network. These intended recipients of these communication may be considered target node computers. Accordingly, a node computer may be a target node computer if it receives communications and it may be a source node computer if it sends communications.

As used herein the terms "gateway," or "gateway computer" refer to computers connected to a network that are disposed between the node computers and the physical network. Gateway computers may be network computers that may be arranged to provide security, access control, communication routing, or the like, for mesh networks or overlay networks. In some embodiments, gateway computers may be configured by another network computer, such as, a management platform computer.

As used herein the term "relay computer", or "relay" refer to one or more computers that serve as intermediaries for establishing connections between gateway computers that may be on different networks. In some cases, relay computers may be associated with network addresses that may be reached from more than one network. In some embodiments, relay computers may be configured by another network computer, such as, a management platform computer.

As used herein the term "ingress identifier" refers to a value included in outbound network packet provided by gateway computers. Ingress identifiers may be included in each packet sent from a gateway computer. Ingress identifiers may be visible to relay computers. For example, in some embodiments, ingress identifiers may be security parameter index (SPI) values included in network packets comprising a network connection that is secured using Internet Protocol security (IPSEC) protocol. Accordingly, in this example, the value of the SPI may be available to relay computers even though most of the packet is encrypted.

As used herein the term "network address" refers to a value or values used for locating an endpoint in a network. In some embodiments, endpoints may include services, networks, network computers, client computers, applications, firewall, router, load balancers, node computers, gateway computers, relay computers, management platform computers, or the like. A network address may be assumed to comprise one or more components, such as, Internet Protocol (IP) address, other network address, a port number, VLAN identifier, tunnel identifier, routing interface identifier, physical interface identifier, a protocol identifier, or the like, or combination thereof. In some embodiments, port numbers may be TCP or UDP port numbers. For example, in some embodiments, a network address in a network may be assumed to include an IP address and a port. The particular constituent components or formats of network addresses may vary to meet one or more characteristics or requirements of the networks or communication protocols being used.

As used herein the term "public key" refers to the public key of an asymmetric cryptographic key pair. A public key may be used as a publicly known identifier for cryptographic identity authentication.

As used herein the term "private key" refers to the private or secret key of an asymmetric cryptographic key pair. A private key is assumed to be known only to the party identified by the corresponding public key. A private key is used by the identified party to authenticate its identity to other parties.

As used herein the term "public key pair" refers to an asymmetric cryptographic key pair consisting of public and private keys. For example, Rivest-Shamir-Adelman (RSA) key pairs, Diffie-Hellman key pairs, or Digital Signature Algorithm (DSA) key pairs are such public key pairs.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing communication over a network for overlay network identity based relays.

In one or more of the various embodiments, a relay engine may be instantiated to perform one or more actions for overlay network identity based relays.

In one or more of the various embodiments, the relay engine may be arranged to receive one or more packets from a source gateway. The one or more packets may be associated with a source gateway identifier (GID) that may correspond to the source gateway and a target GID that may be associated with a target gateway such that each GID is separate from a network address or a hostname of the source gateway or the target gateway.

In one or more of the various embodiments, the relay engine may be arranged to determine a connection route based on an association between the connection route and an ingress identifier such that the ingress identifier may be obtained from the one or more packets from the source computer that may be separate from the source GID.

In one or more of the various embodiments, the relay engine may be arranged to provide the connection route based on the source GID and the target GID such that the connection route may be associated with both the source GID and the target GID.

In one or more of the various embodiments, the relay engine may be arranged to determine network address information associated with the target gateway based on the connection route. And, in one or more of the various embodiments, the relay engine may be arranged to forward the one or more packets provided by the source gateway to the target gateway based on the network address information.

In one or more of the various embodiments, the relay engine may be arranged to receive an initial handshake message from another gateway. In one or more of the various embodiments, the relay engine may be arranged to determine a delay period based on one or more of, the GID associated with other gateway, the GID associated with another target gateway, policy associated with the relay, one or more performance metrics, or the like. In one or more of the various embodiments, upon an expiration of the delay period, a response message may be provided to the other gateway such that a first relay that provides the response message to the other gateway is used to establish the connection route.

In one or more of the various embodiments, the relay engine may be arranged to receive an initial handshake message from another gateway. In one or more of the various embodiments, another ingress identifier and another GID associated with the other gateway may be obtained. And, in one or more of the various embodiments, the other ingress identifier may be employed to index the other GID data store.

In one or more of the various embodiments, the relay engine may be arranged to translate the one or more packets from the source gateway from a first network protocol to a second network protocol that is compatible with the target gateway.

In one or more of the various embodiments, the relay engine may be arranged to monitor the one or more packets to identify keep-alive packets. And, in one or more of the various embodiments, the relay engine may be arranged to drop one or more connections between one or more gateways associated with keep-alive packets based on one or more performance metrics.

In one or more of the various embodiments, the relay engine may be arranged to drop one or more connections between one or more gateways based on one or more performance metrics exceeding one or more defined thresholds.

In one or more of the various embodiments, a gateway engine may be instantiated to broadcast an initial handshake message to one or more relays. And, in one or more of the various embodiments, the gateway engine may establish a connection with a relay that is first to respond to the initial handshake message.

In one or more of the various embodiments, a platform engine may be instantiated to provide policy information that may define one or more connection routes in an overlay network to one or more relay engines and to one or more gateways such that each connection route may be associated with two or more GIDs.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, management platform server computer 116, gateway computers 118, relay computers 120, node computers 122, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like.

For example, client computers 102-105 may be configured to operate as a web server, client application, media player, mobile telephone, game console, desktop computer, or the like. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Node computers 122 represent one or more client computer, network computer, or network devices, or the like, that may be arranged to access networks via a gateway computer. Each node computer may be associated with a gateway computer that enable network access to other node computers, gateway computers, or the like. Node computers 122 may be arranged to communicate with their associate gateway computer. Accordingly, in some embodiments, their gateway computer may route the node computer communication according to policy provided by a management platform server, such as, management platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, management platform server computer 116, gateway computers 118, relay computers 120, node computers 122, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 1 illustrates management platform server computer 116, gateway computers 118, relay computers 120, node computers 122 each as a single computer, the innovations or embodiments are not so limited. For example, one or more functions of management platform server computer 116, gateway computers 118, relay computers 120, node computers 122 or the like, may be distributed across one or more distinct network computers. Moreover, management platform server computer 116, gateway computers 118, relay computers 120, node computers 122 are not limited to a particular configuration such as the one shown in FIG. 1. Thus, in one or more embodiments, management platform server computer 116, gateway computers 118, relay computers 120, node computers 122 may be implemented using a plurality of network computers. In other embodiments, management platform server computer 116, gateway computers 118, relay computers 120, node computers 122 may operate as a plurality of network computers within a cluster architecture, a peer-to-peer architecture, or the like. Also, in some embodiments, one or more processors on one or more network computers may be arranged to perform one or more actions of management platform server computer 116, gateway computers 118, relay computers 120, node computers 122, or the like. Further, in at least one of the various embodiments, management platform server computer 116, gateway computers 118, relay computers 120, node computers 122 may be implemented using one or more cloud instances in one or more cloud computing environments. Likewise, in at least one of the various embodiments, management platform server computer 116, gateway computers 118, relay computers 120, node computers 122 may be implemented using one or more container instances in one or more container computers environments.

Illustrative Client computer

Figure 2:
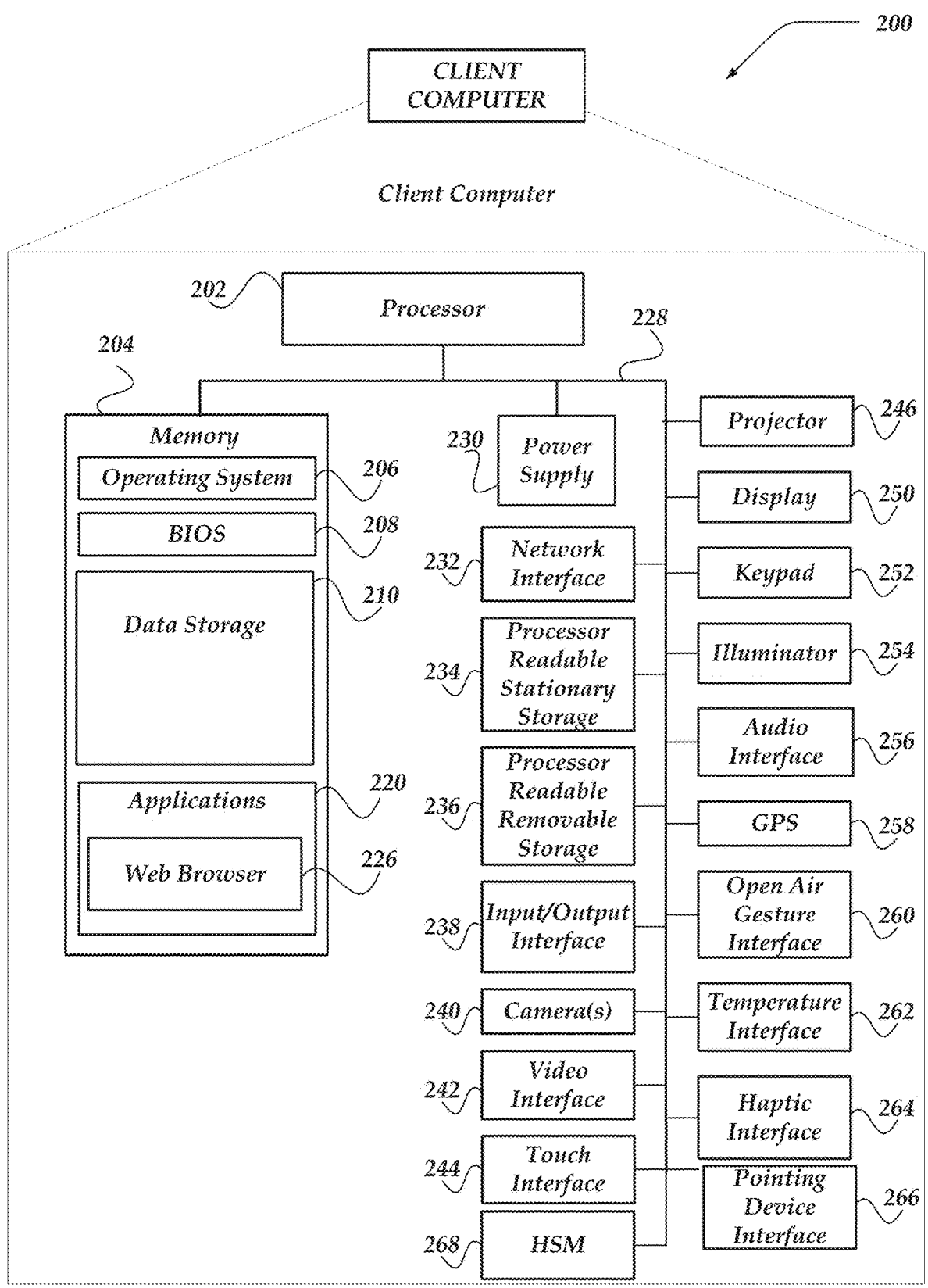
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers 102-105 shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like. Web browser 226 may be used to configure routes on management platform server computer 116, as discussed below in conjunction with FIG. 3. For example, a user may operate web browser application 226 in order to enable a first group of node computers to communicate with the second group of node computers through one or more gateway computers or relay computers.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, web browser 226. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
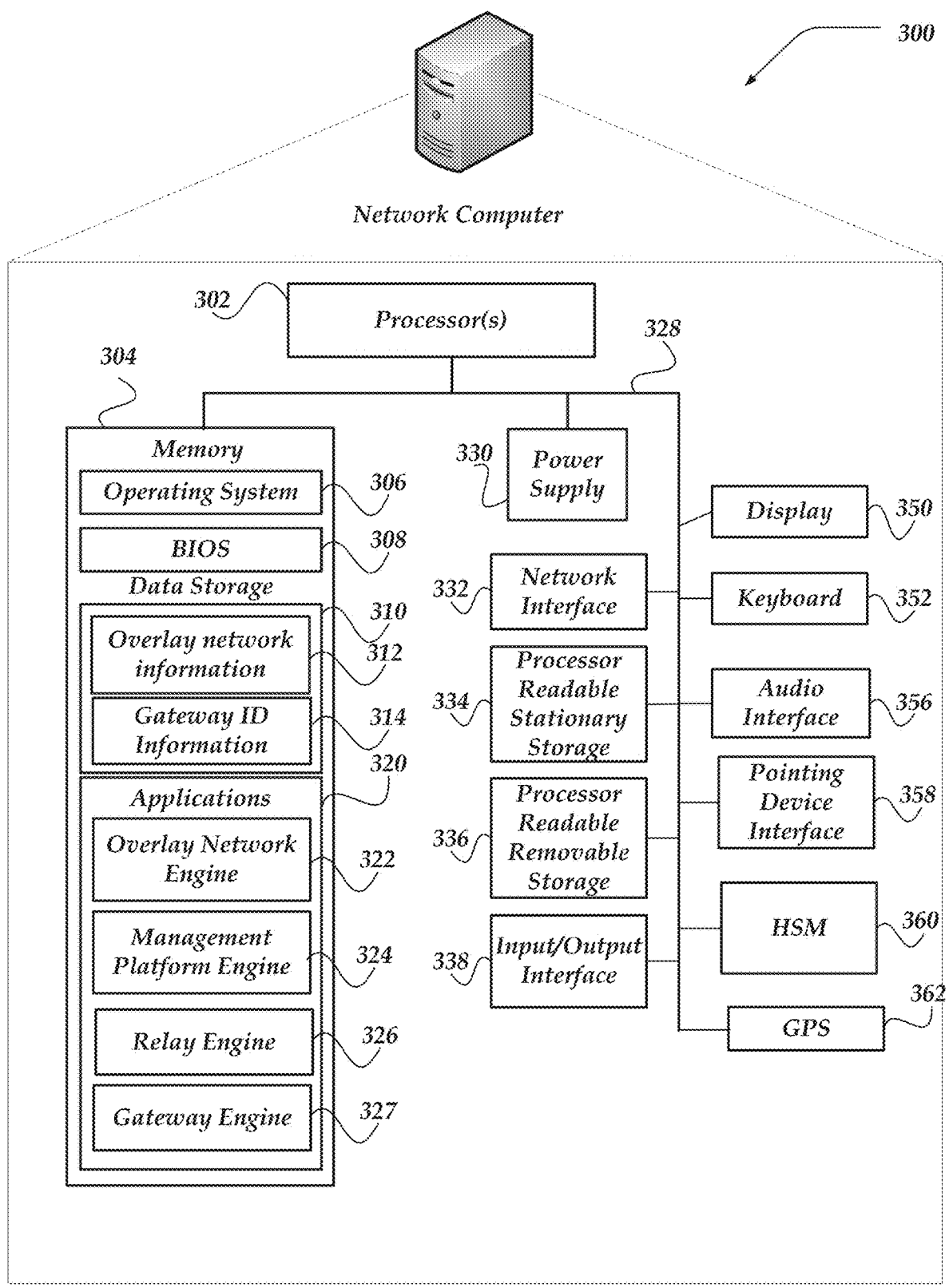
FIG. 3 shows one embodiment of a network computer, in accordance with at least one of the various embodiments.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of one or more of management platform server computer 116, gateway computers 118, relay computers 120, or one or more node computers 122 of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

In at least one of the various embodiments, processor 302 may include one or more separate hardware processors that are arranged to perform one or more specific task or actions. Also, in some embodiments, the one or more hardware processors comprising processor 302 may be the same processor. In some embodiments, the one or more hardware processors comprising processor 302 may be the included in the same network computer. In some embodiments, one or more of the one or more hardware processors comprising processor 302 may be included in different network computers.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

Data storage 310 may include, for example, overlay network information 312, gateway ID information 314, or the like. Overlay network information 312 may contain policy data defining which gateways, relays, or node computers are allowed to communicate with each other as well as the physical network routes that may be available. In one embodiment, overlay network information 312 may be generated and stored on management platform servers, such as, management platform server computer 116 before being distributed to gateway computers 118 and relay computers 120.

Data storage 310 may also include gateway identifier information 314 that may include information for identifying the gateway computer endpoints of for connection routes. A network address (e.g., IP address and port) for a given gateway computer may be discovered by a relay computer when the gateway computer initiates a connection to the relay computer. In scenarios when a gateway computer is located in a private network a public facing network address for that gateway computer may not be knowable unless the gateway computer initiates a connection outside of the private network.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network engine 322, management platform engine 324, relay engine 326, or gateway engine 327 which may be enabled to perform actions further described below. In at least one of the various embodiments, one or more of the applications or portions of applications may be implemented as modules or components of another application. Further, in one or more of the various embodiments, applications or portions of applications may be implemented as operating system extensions, modules, plugins, or the like.

In at least one of the various embodiments, applications, such as, operating system 306, overlay network engine 322, management platform engine 324, relay engine 326, gateway engine 327, or the like, may be arranged to employ geo-location information to select one or more localization features, such as, time zones, languages, currencies, calendar formatting, or the like. Localization features may be used when interpreting network traffic, interpreting node computer activity, monitoring or logging application activity, user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 110.

Furthermore, in at least one of the various embodiments, overlay network engine 322, management platform engine 324, relay engine 326, gateway engine 327, or the like, may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to overlay network engine 322, management platform engine 324, relay engine 326, gateway engine 327, or the like, may be provisioned and de-commissioned automatically. Also, in at least one of the various embodiments, overlay network information 312, gateway identifier information 314, or the like, may located in virtual servers running in a cloud-based computing environment rather than being tied to one or more specific physical network computers. In some embodiments, various applications, data storage, or the like, may be operative in one or more container computers executing in a container computing environment.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
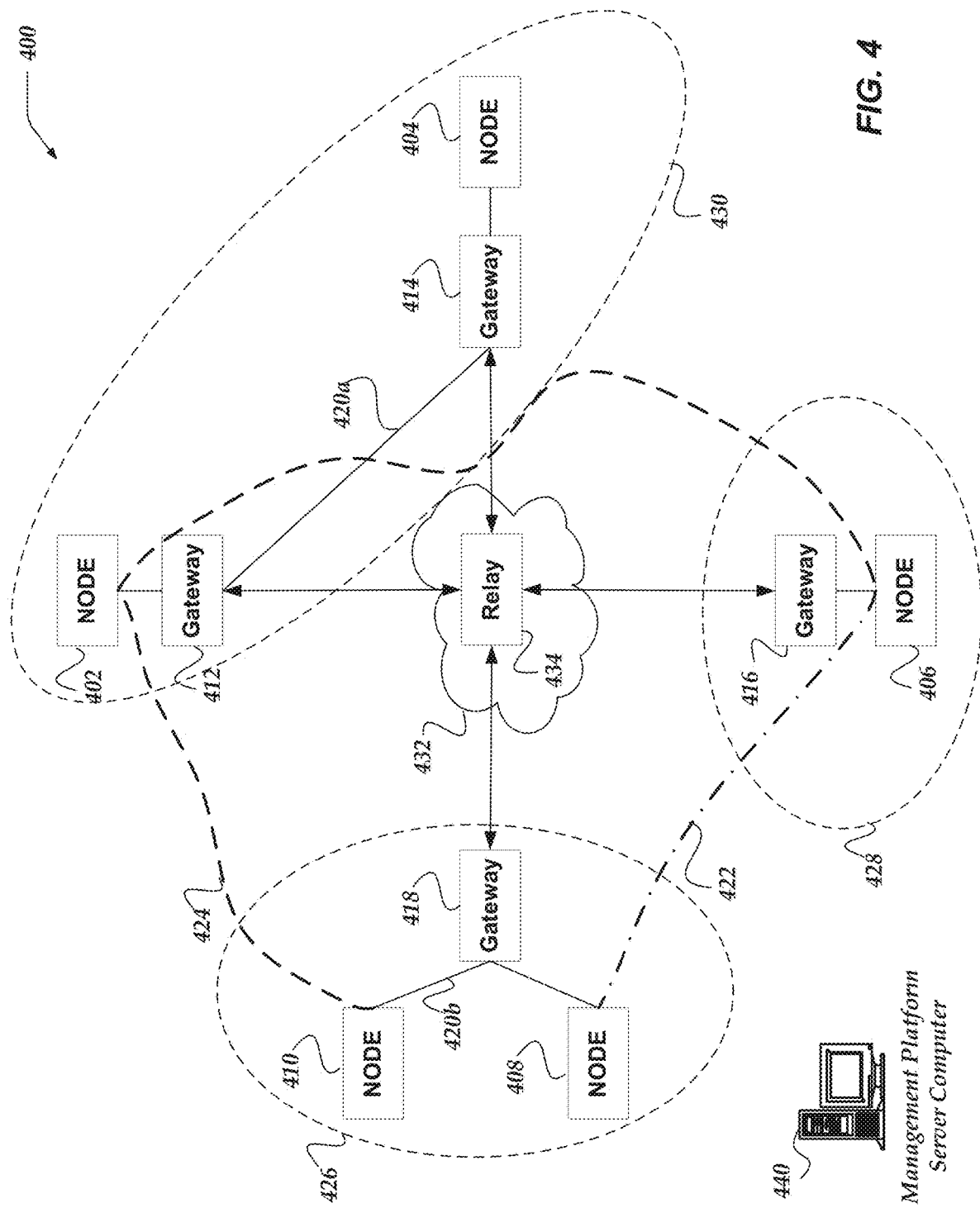
FIG. 4 illustrates a logical schematic of a network that includes overlay networks, node computers, gateway computers, relay computer in accordance with at least one of the various embodiments.

FIG. 4 illustrates a logical schematic of network 400 that includes overlay networks, node computers, gateway computers, relay computer in accordance with at least one of the various embodiments. Network 400 is arranged to include gateway computers, such as, gateway computers 412-418. Gateway computers may be disposed between one or more node computers and the underlying physical network infrastructure. In at least one of the various embodiments, the gateway computers may be arranged such that they isolate node computers, such as, node computers 402-410 from the physical network used to interconnect them. Also, in this example, management platform server computer 440 represents one or more management platform servers that may be assumed to be arranged to communicate over one or more networks with relay computers and gateway computers that comprise network 400. In one or more of the various embodiments, among other things, management platform server 440 may be arranged to manage the configuration or distribution of policy information.

In this example, physical networks, such as, physical network 420*a*, physical network 420*b*, a public network 432 provide an underlying physical network comprising network 400. In this example, node computer 404 is isolated from physical network 420*a* by gateway 414.

Also, in one or more of the various embodiments, private networks, such as, private network 426, private network 428, or private network 430 may represent separate or isolated networks that may be configured to prevent computers them from being visible or directly accessible from outside each of the private networks.

In some embodiments, gateway computers may be arranged to communicate with one or more relay computers, such as, relay computer 434 via another network, such as, network 432. In some embodiments, relay computer 434 may be arranged to have a network address that may be visible from computers that may be part of other networks, including private networks, such as, private network 420a and private network 420b, or the like.

Accordingly, in at least one of the various embodiments, the gateway computers may be configured to provide or enforce one or more overlay networks in network 400. In this example, for some embodiments, overlay network 422 enables node computer 406 and node computer 408 to "see" each other on the network; communication from node computer 406 to node computer 408 may be routed through gateway computer 416 to network 432 to relay 434 to gateway computer 418; and the communication may then be routed from gateway computer 418 to node 408 over private network 420b. From the point-of-view of node computer 406 and node computer 408 the communication appears to go directly over overlay network 422. In actuality the communication will be routed from node 406 to gateway computer 416 to relay 432 to gateway computer 418.

Likewise, in this example, network 400 may be arranged such that node computer 402, node computer 406, and node computer 410 communicate over overlay network 424. As described above, in at least one of the various embodiments, the communication among/between the nodes on overlay network 424 may be routed through relay 434 and two or more of the gateway computers.

In at least one of the various embodiments, the gateway computers may be configured with one or more rule-based policies that determine access or restrictions for network communication on the networks. The particular rules or restrictions associated with how communication information (e.g., network packets) should be routed through the mesh network may be established by a management platform computer, such as management platform server computer 440, or the like. Configuration information may be pushed (e.g., router tables) to each gateway computer to define the overlay networks, if any, as well other restrictions that may be applicable for one or more networks.

In at least one of the various embodiments, gateway computers may be arranged to include an explicit list of computer addresses/identities that are allowed to communicate with the gateway computer. Accordingly, if a node computer, such as, node computer 410 is in gateway computer 418's list of allowed computers (e.g., a whitelist) it may be enabled to initiate communication over the mesh network through gateway computer 418. Conversely, node computers, or any other computer for that matter, not in a gateway computer's whitelist may be denied access to that gateway computer and the mesh network. Though, in some embodiments, a node computer may be allowed to access one or more particular gateway computers and denied accessed to others. In at least one of the various embodiments, a management platform computer, such as, management platform server computer 440, may be arranged to manage and distribute the whitelists to the one or more gateway computers.

In at least one of the various embodiments, by placing gateway computers between physical networks (e.g., private network 420a or private network 420b) and the node computers, the configuration or definition of one or more overlay networks may be accomplished without requiring the individual node computers to be reconfigured. Further, in at least one of the various embodiments, gateway computers may comprise security hardened computers that provide various routing, security and/or cryptography features to help secure the one or more networks. Otherwise, in at least one of the various embodiments, the network may be reliant on the security features of the node computers themselves which may be non-existent or very limited.

In at least one of the various embodiments, overlay networks may be enforced by using an overlay whitelist that defines the endpoints (e.g., node computer, gateway computers, relays, or the like) that may be accessed from other members of the overlay network. Accordingly, in at least one of the various embodiments, the computers on a given overlay network may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, management platform computer 440 may be arranged to manage and distribute the overlay whitelists to each gateway computer comprising a mesh network.

In some embodiments, computers in different networks may be unable to identify or access each other because this their local networks are using separate (perhaps conflicting) network address namespaces. For example, gateway computer 418, and consequently, node computers 408 and 410, cannot be accessed from outside of the private network 420b without gateway computer 418 first initiating a connection outside of private network 420b. This may be true even if a public network address associated with private network 420b is known because the network address of node computers in private networks, such as, private network 420b are not generally available to computers outside of the same private networks.

In some embodiments, relay computers, such as relay computer 434, may be associated with network addresses that are accessible from computers in one or more private or one or more public networks, in some cases, this may include the public Internet. In one embodiment, a node computer may request that a gateway computer initiate a connection to another node computer via another gateway computer that are located in another network. However, if neither gateway computer can see the other, because they are both located in separate private networks, one or more relay computers, such as, relay computer 434 may be employed to bridge the networks to enable node computers in one network to reach node computers in another network.

In one embodiment, a gateway computer may be arranged to send an initial connection request packet to a relay computer. In some embodiments, the initial packet may include at least a gateway identifier (GID) of the source gateway computer and a GID of the target gateway computer. The relay may authorize or facilitate communication between the source gateway computer and the target gateway computer based on policy information received from management platform server 440. Once authorized, relay 434 may participate in the establishment and maintenance of the connection with the target gateway computer by forwarding the "I1" initiator packet to the target gateway computer, while continuing to forward control packets between the source and target gateway computers.

In one or more of the various embodiments, control packets may include handshake packets such as initiator 1, responder 1, initiator 2, and responder2, or the like, to established connections between gateway computers. Other control packets may include keep-alive packets that are sent from a gateway computer to a relay computer.

For example, gateway computer 418 may send an "I1" packet to relay 434 over network 432 where the "I1" packet includes a gateway identifier (GID) associated with gateway computer 418 as the source and a GID identifying gateway computer 414 as the target. If relay 434 has established a connections with gateway computer 414, relay 434 will have already obtained and indexed information, such as, ingress identifier to use for routing packets to gateway computer 414, such as, a security parameter index (SPI) associated with the connection to gateway 414, as well as, a network address (or other tuple information) for accessing gateway 414. In some embodiments, relay 434 may obtain information from network packets sent by gateway 418 to obtain information for identifying or associate network packets or network flows with gateway 418, such as, an SPI associated with the connection to gateway 418, as well as, a network address (or other tuple information) for accessing gateway 418. If network addresses of both gateway computers are known and indexed by relay 434, relay 434 may be arranged to employ this information to forward handshake packets between them. However, in this example, if relay 434 has not received an initialization packet from gateway computer 414, relay 434 may be arranged to drop the "I1" request. In one or more of the various embodiments, relay 434 may continue dropping request to communicate with gateway 414 until relay 434 has obtained and indexed gateway computer 414's identification information (e.g., ingress identifier, network address information, or the like).

In one or more of the various embodiments, a gateway computer, such as, gateway computer 418, or the like, may broadcast requests to establish a connection to a target gateway computer to multiple relays. For example, gateway computer 418 may broadcast an "I1" packet to two or more relays. This broadcast technique performs the process discussed above to attempt to establish a connection with the two or more relays independently and in parallel. In one embodiment, the relay computer selected by the gateway computer may be the first relay computer to complete the handshake process. Further, in some embodiments, additional criteria or conditions may be applied to select a relay computer from among two or more available relay computers.

In one embodiment, management platform servers, such as, management platform server 440 may be arranged to enable users or operators to create relay policy rules. For example, a relay policy rule may define that gateway computer 418 may communicate with gateway computer 414 via relay 434. In some embodiments, relay policy rules may be defined in terms of groups of gateway computers or groups of relays.

In one or more of the various embodiments, if connections may be routed through one of a plurality of relays, these connections may be actively balanced to improve throughput, latency, and cost efficiency. In one embodiment, an overburdened relay may simply drop a connection. For example, if gateway computer 418 is connected to gateway computer 414 through relay 434, and relay 434 drops the connection, gateway computer 418 may attempt to use another relay computer allowed by the current policy rules. Additionally or alternatively, relays that are overburdened with connections may artificially delay processing new initialization packets to enable faster responding relay computers to establish connections with the requesting gateway computers. For example, before forwarding an "I1" packet on to a destination gateway computer, an overburdened relay may insert a delay that causes the route through that particular relay to appear to be slow, making it less likely that a route using the overburdened relay will be chosen.

In one or more of the various embodiments, rebalancing may also be achieved by arranging relay computers that have excess capacity to actively prioritize new connections. For example, if relay 434 determines that an above average number of keep-alive packets are being processed, as opposed to connections transmitting actual data, relay 434 may prioritize participating in new connections. For example, if relay 434 receives a new "I1" initialization packet, it may prioritize processing the packet above other system functions, thereby increasing the chance that it will have the lowest latency. Similarly, in some embodiments, a relay computer that has an above average number of keep-alive packets may also prioritize keeping alive the connections it is currently participating in.

In one or more of the various embodiments, while gateway computers may be stationary on a network, in that they maintain the same network address indefinitely, the network address for a gateway computer may change from time to time. For example, a gateway computer may be moved to a different location, e.g. to another building on a corporate campus that is associated with a different range of network addresses. Similarly, a gateway that is a mobile device such as a smart phone may pass between cell towers or access points, each of which may be associated with a different network addresses. In one or more of the various embodiments, gateway computers may also experience a change in network address if the network changes, e.g. if a new internet service provider (ISP) is introduced. However it happens, if a network address associated with a gateway computer changes, any existing connections using that network address will be dropped. However, because identity based networking does not rely on a host's location as identity, the connection can be seamlessly re-established if management platform server 440 discovers the change and broadcasts the new network address for the gateway computer. For example, if gateway computer 416 determines that its network address has changed, it will notify its associated management platform server of the change. In one or more of the various embodiments, the management platform server may then broadcast updated policies that include rules for the new network address. Accordingly, in one or more of the various embodiments, an existing connection between gateway computer 416 and gateway computer 412 through relay 434 may continue once relay 434 receives an updated policy from management platform server 440.

In one or more of the various embodiments, gateway 416 may attempt to inform gateway 412 of its new network address, via relay 434. Accordingly, in some embodiments, relay 434 may be arranged to detect this new network address mapping and update itself accordingly. The peer gateway 412 may also get the new network address, but since the communication between the two gateways is being relayed, gateway 412 does not need to do anything differently.

In one or more of the various embodiments, connections between gateway computers may be maintained with or without connection to the management platform server. In some embodiments, gateway computers may be arranged to inform each other of their own address updates, for active connections between gateway computers. In contrast, new connections, will need to obtain the latest reachable address from the management platform server.

It is also possible for a device, such as one of nodes 402, 404, 406, 408, or 410, to be moved to a different gateway computer. In this scenario, management platform server 440 has to be notified of the new configuration before the node is to work again properly. For example, if node 410 were moved from private network 420*b* to private network 420*a*, management platform server 440 could be informed, either manually or automatically, and then update relevant relays with new policies. For example, the relay policy may include a rule that prescribes that gateway 416 may be relayed to gateway 412. Accordingly, in some embodiments, relay computers can enforce relay policy without seeing inside the connections between gateways. Thus, in some embodiments, relays may be arranged to be unaware of the nodes or node policies. For example, node 410 is not known to the relay; it works with the gateway computers.

Existing connections may time-out or reset automatically, when it is discovered that endpoint no longer exists at the network address the connection is directed towards. Once a connection has timed-out or reset, a new connection may be initiated and the connection between endpoints may continue uninterrupted.

Figure 5:
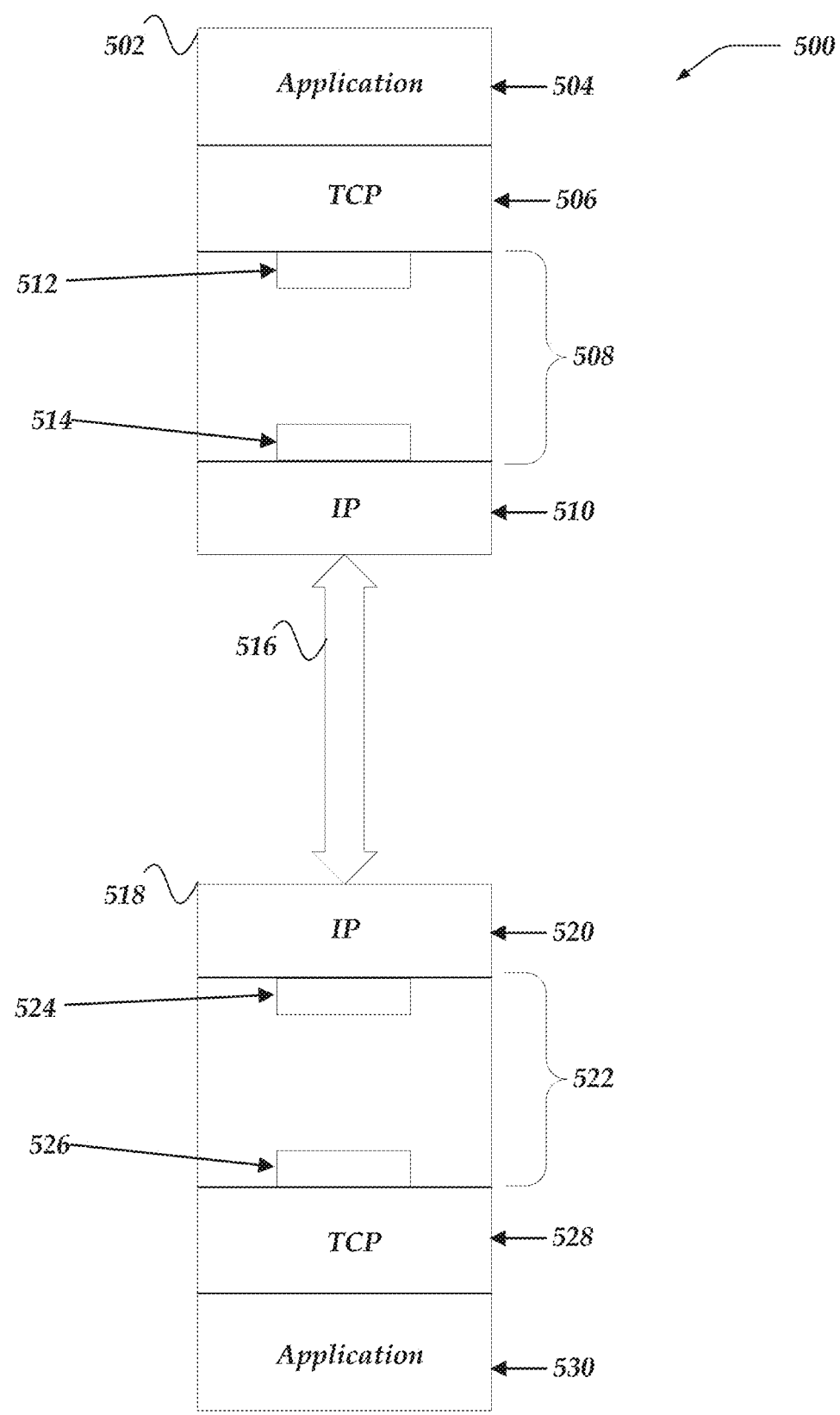
FIG. 5 illustrates a logical representation of a system for communicating in a network in accordance with one or more of the various embodiments.

FIG. 5 illustrates a logical representation of system 500 for communicating in a network in accordance with at least one of the various embodiments. In at least one of the various embodiments, communications that are processed on a gateway computer may comprise various logical layers that may comprise a functional network communication stack. In at least one of the various embodiments, a communication on one gateway computer, such as, communication 502 may be arranged such that an application layer, such as, application layer 504 may perform actions that include communication; next at layer 506, one or more standard network protocols APIs (TCP in this example) may be employed; at layer 508 one or more special actions may be performed to support the overlay networks. And, before the communication is sent out, the lower level layers, such as, layer 510 (IP layer in this example) may be applied.

In at least one of the various embodiments, gateway computers may be arranged to substitute their GID for use as a network address by higher layers such as application layer 504 and TCP layer 506. The GID may be arranged to be compatible with the native data structures that may be used to represent actual network addresses. Accordingly, in at least one of the various embodiments, application level networking API's that accept network address data structures as parameters may be enabled to accept GID instead. For example, in some embodiments, an internet address may be represented using a 32-bit value. Thus, in such embodiments, the GID may be a 32-bit number, making it size compatible with an ordinary network address value.

In at least one of the various embodiments, at the gateway layer, layer 508 in FIG. 5, the GID of the source gateway and/or the target gateway are mapped to an actual network address. In at least one of the various embodiments, component 512 may represent components that are arranged to map GIDs to network addresses, and component 514 may represent components that are arranged to map from a network address to a GID.

In at least one of the various embodiments, since the GIDs may be mapped to an actual network address, a network layer, such as IP layer 510 may generate the appropriate network protocol information for the communication. Accordingly, in at least one of the various embodiments, network path 516 may be employed to communicate the communication network packets to its next destination.

In at least one of the various embodiments, communication 518 represents the received version of communication 502. The network protocol layer (IP layer 520) accepts the communication over the network; gateway layer 522 employs component 524 and component 526 to map network addresses to GIDs; TCP layer 528 performs higher level network protocol actions using the GID in place of the network address; and application layer 530 employs the payload of the communication to perform application specific actions based on the actual contents of the payload.

FIG. 6 illustrates a portion of policy 600 for defining connection routes allowed between pairs of gateway computers. Specifically, data object 502 lists pairs of gateway computers that are defined as authorized to connect with each other. In one or more of the various embodiments, data object 502 includes column 504, which lists public keys associated with one of two gateway computers authorized to connect with each other, while column 506 lists public keys associated with the corresponding gateway computers. For example, the first row of table 502 indicates that the gateway computer having the public key that begins with "MIICWg" may connect with the gateway computer having the public key that begins with "QpEzw0". Similarly, the second row indicates that the gateway computer with the public key beginning with "MIICWg" may also connect with the gateway computer having the public key that begins with "OzXeYr".

In one embodiment, a network policy provided by a management platform server may include a list of pairs of gateway computers that are authorized to connect with each other. In one embodiment the list of pairs is defined by a list of pairs of gateway identifiers (GIDs). In one or more of the various embodiments, GIDs may be created by applying a hash function to a public key or other shared secret.

For example, data object 608 includes a list of pairs of GIDs that define which gateway computers may be authorized to connect with each other. Similar to data object 602, data object 608 includes column 610 which lists GIDs for one of two gateway computers allowed to connect, while column 612 lists GIDs for the other of the two gateway computers allowed to connect. In one embodiment, data object 608 comprises a network policy that is distributed by a management platform server to each of the relay computers and gateway computers in associated with an overlay network.

FIG. 7 illustrates connection information 700 for accumulating at least some of the information that enables overlay network identity-based relay between gateway computers. In one or more of the various embodiments, data object 702 includes ingress identifiers columns 704 and 710, GID columns 706 and 712, and gateway computer network address columns 708 and 714. In one or more of the various embodiments, data object 702 lists pairs of gateway computers that are allowed to connect to one another, as defined by a policy received from a management platform server.

In one or more of the various embodiments, columns 704, 706, and 708 may be associated with a first gateway computer in a given pair of gateway computers (e.g., Gateway A), while columns 710, 712, and 714 may be associated with a second gateway computer (Gateway B) in the given pair of gateway computers. For example, in some embodiments, row 716 defines that the gateway computer with GID "0x23fd7a39153cab91" may connect to the gateway computer with GID "0x354cb98e4fa65002".

As discussed above, the ingress identifier may be used to distinguish different network packet streams (network flows). For example, in some embodiments, connections having different Encapsulated Security Protocols (ESPs) as part of an Internet Protocol security (IPsec) protocol may be identified using their security parameter index as an ingress identifier. In one embodiment, each gateway computer may be arranged to select a random number as an ingress identifier (e.g., SPI), and include it within packets communicated during an initial handshake. In one embodiment, a relay computer may observe the ingress identifier values, associate them with a GID and an network address, and insert them into data object 702. In one embodiment, ingress identifier values are used as indices into data object 702 when routing data over a connection, Accordingly, in some embodiments, an ingress identifier may be used to lookup connection route information for the target gateway computer.

In one embodiment, ingress identifiers may be SPI values are 32 bits, ranging from 0 to approximately 4,294,967,295, and while this may provide a large number of potential values compared to a number of connections typically maintained by a relay, it is still possible for collisions to occur—i.e. a first gateway computer and a second gateway computer (or a first gateway computer and a third gateway computer) may randomly select the same ingress identifier while trying to connect to the same relay, even if the first and second gateway computer are not in communication with each other.

In one embodiment, a relay computer may be arranged to discover duplicate ingress identifiers when the relay computer processes a handshake packet, such as, an "I1" packet. In this example, for one or more of the various embodiments, if a duplicate ingress identifier value is found in data object 702, the handshake packets may be dropped (e.g. not responded to). In one embodiment, the relay may also send an error code or other message to the gateway computer indicating a duplicate ingress identifier as the cause of the error. Upon receiving an indication of the error, or upon timing out after re-trying "I1" packets with the same ingress identifier a defined number of times, the gateway computer attempting to use an ingress identifier that is already in data object 702 may be arranged to generate a new ingress identifier and try again to establish a connection with a relay computer.

In one embodiment, columns 706 and 712 include gateway identities (GIDs). In one or more of the various embodiments, GIDs may be cryptographic hashes of a public key associated with the corresponding gateway computer, similar to columns 710 and 612 as described above in conjunction with FIG. 6.

In one or more of the various embodiments, columns 708 and 714 contain network address information associated with gateway computers, such as, IP addresses and ports. In one embodiment, the gateway computers may exist behind a NAT on a private network and have been assigned a private IP address (i.e. an IP address that is not generally addressable from hosts on the public internet). However, the IP addresses stored in columns 708 and 714 may be the IP addresses of the NAT device that is creating the private network, while the ports stored in columns 708 and 714 may be mapped by the NAT device to a particular host on the private network.

Notably absent from data object 702 are shared secret keys or other artifacts of the connection request handshake that might be used to decrypt data packets as they are forwarded to gateway computer. During a handshake exchange, gateway computer endpoints generate shared secret keys using a cryptographic algorithm such as Diffie-Hellman. This prevents a man-in-the-middle, such as a relay computer or other network computer, from determining the secret key. Thus once a connection is established between two gateway computers, a relay forwards packets, without decrypting their contents, based on the ingress identifiers of incoming packets and columns 708 and 714 of data object 702 to locate the actual destination network address that may be associated with gateway computers. In this way, scalability or performance may be improved by avoiding processor intensive decryption and re-encryption operations at the relay computer.

Further, in some embodiments, the initial handshake process used to establish links between relays and gateway computers may be stateless. Accordingly, in some embodiments, link state information is not stored at the relay computers or target gateway computers until an initial exchange of secrets is verified and authenticated. For example, a first control packet may include secrets from the source gateway computer and the second control packet sent in response from the target gateway computer may include secrets associated with the target gateway computer. But, at this point in the handshake neither endpoint is storing connection state. Accordingly, malicious attacks that attempt to disrupt gateway computers or relays by consuming resource by creating half-open connections (e.g., SYN flood style attacks, or the like) may be prevented because there is no connection related state is stored until secrets exchanged between the target and source are verified and authenticated.

Figure 8:
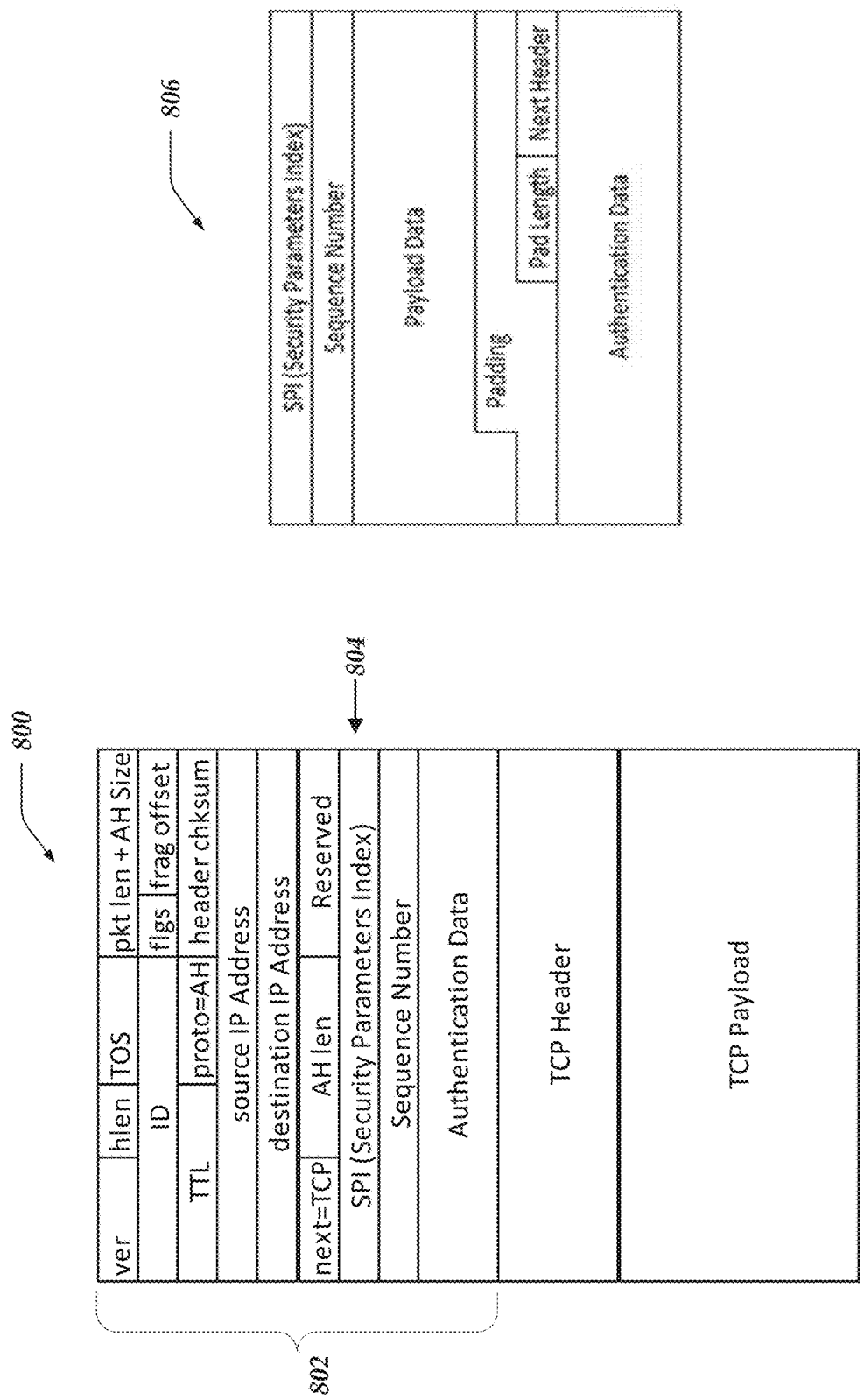
FIG. 8 illustrates a logical representation of a standards compatible network packets that may be used to communicate between gateway computers in accordance with one or more of the various embodiments.

FIG. 8 illustrates a logical representation of network packet 800 and network packet 806. Network packet 800 is an example of a standards compatible network packet that may be used to communicate between gateway computers or relay computers. In this example, the network packet represents the well-known structure of an IPSEC packet. According to the IPSEC protocol, the fields for an IPSEC header comprise the fields in header 802. One of those fields, 804, is suitable for storing an SPI field of an IPSEC header. Further, in one or more of the various embodiments, Encapsulating Security Payload (ESP) network packets, such as, network packet 806 which is also part of the IPSEC protocol may be used to establish connections or communicate between gateway computers or relay computers.

One of ordinary skill in the art will appreciate and understand the various fields of an IPSEC protocol network packets. Accordingly, it is in the interest clarity and brevity that all of the fields are not further explained here.

Generalized Operations

Figure 9:
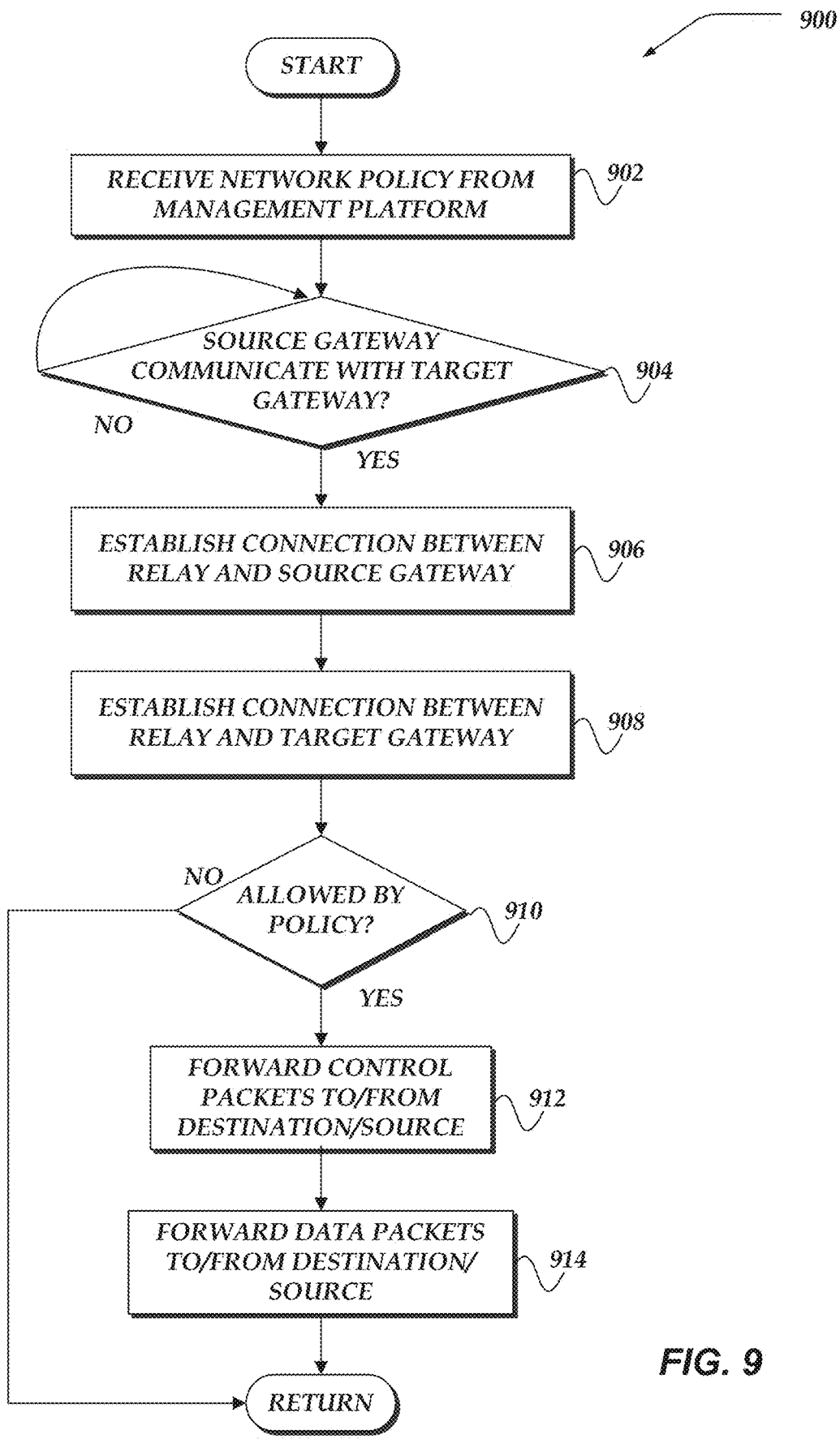
FIG. 9 illustrates an overview flowchart of a process for overlay network identity-based relay in accordance with one or more of the various embodiments.
Figure 10:
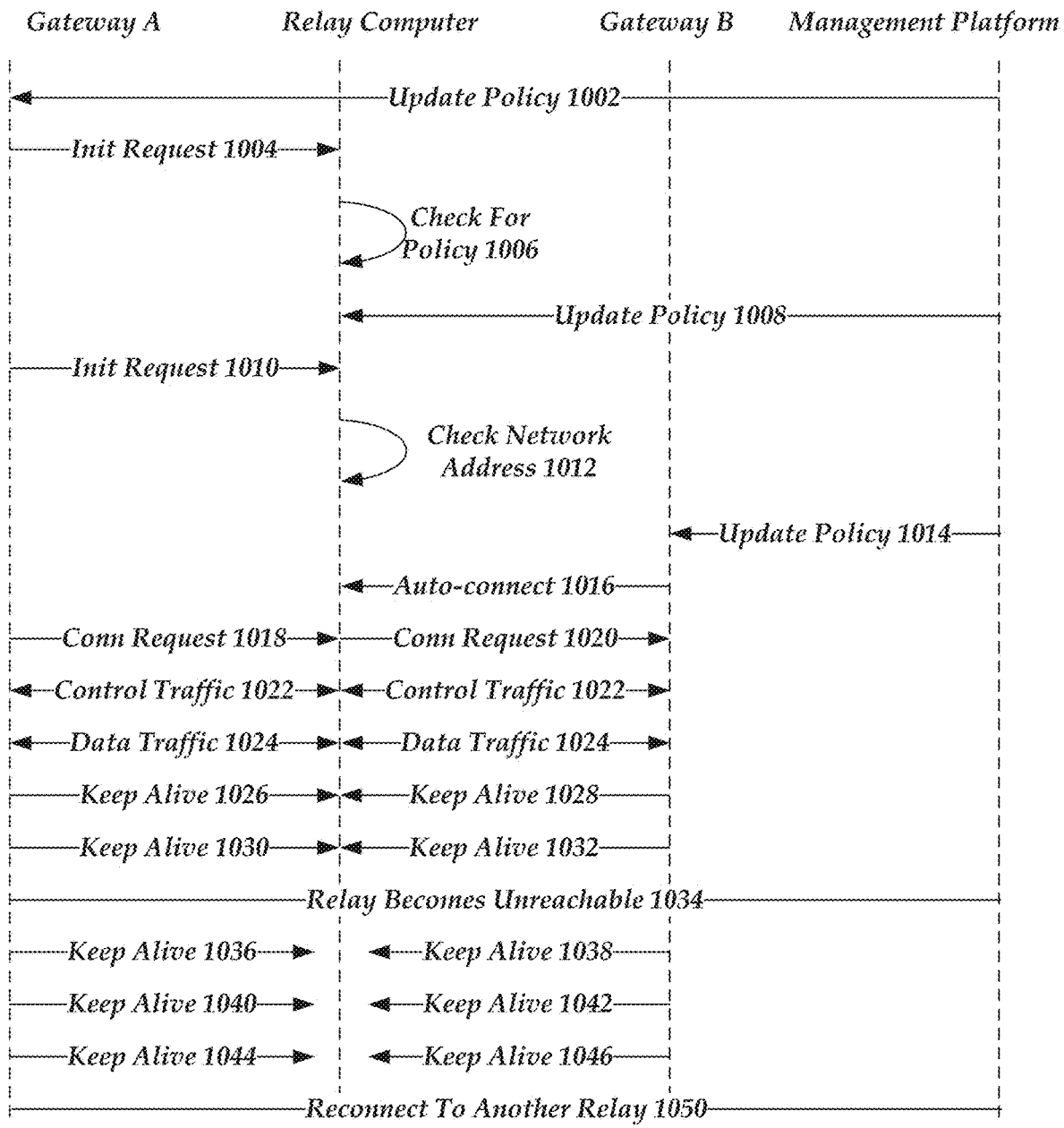
FIG. 10 illustrates a sequence diagram for overlay network identity-based relay in accordance with one or more of the various embodiments.

FIGS. 9-10 represent the generalized operation of overlay network identity-based relay in accordance with at least one of the various embodiments. In at least one of the various embodiments, processes 900 and 1000 described in conjunction with FIGS. 9-10 may be implemented by and/or executed on one or more processors of a relay computer, a gateway computer, and/or a conductor, such as network computer 300 of FIG. 3. In other embodiments, these processes, or portions thereof, may be implemented by and/or executed on one or more processors of a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 9-10 may be used for overlay network identity-based relay in accordance with at least one of the various embodiments and/or architectures such as those described in conjunction with FIGS. 4-8. Further, in at least one of the various embodiments, some or all of the action performed by processes 900 and 1000 may be executed in part by overlay network engine 322, management platform engine 324, relay engine 326, gateway engine 327, or the like, or combination thereof.

FIG. 9 illustrates an overview flowchart of process 900 for overlay network identity-based relay in accordance with at least one of the various embodiments. In one embodiment, process 900 may be implemented by relay computers 120 of FIG. 1, or the like. After a start block, at block 902, in at least one of the various embodiments, overlay network policy may be obtained from a management platform server, such as, management platform server computer 116 of FIG. 1. In one or more of the various embodiments, the policy may define allowed routes between gateway computers, e.g. a whitelist of allowed connections. In one embodiment the pairs of gateway computers are denoted by pairs of gateway identifiers (GIDs). A GID may, in one embodiment, comprise a 128 bit cryptographic hash of a public keys associated with a gateway computer. In one embodiment, a relay computer instantiating process 900 may be arranged to have one or more network interfaces that may be assigned network addresses that are addressable or otherwise accessible from two or more networks. For example, a relay computer supporting two or more gateway computers located on separate networks may be configured such that the relay computer may be accessible by the two or more gateway computer.

At decision block 904, in one or more of the various embodiments, if a source gateway computer is ready to initiate communication with a target gateway computer, control may flow to block 906; otherwise control may loop back to decision block 904. For example, in one or more of the various embodiments, a node computer associated with the source gateway may be attempting to communication with a node computer that is associated with the target gateway which may be located in another network that may not be directly reachable by the source gateway computer. Accordingly, in one or more of the various embodiments, the source gateway computer may attempt to employ a relay computer to facilitate communication the target gateway computer.

Note, in one or more of the various embodiments, policy information provided by the management platform server may include information used by the source gateway computer to determine if the node computer trying to be reached is associated with the target gateway computer.

At block 906, in at least one of the various embodiments, a connection may be established between the relay computer and the source gateway computer. In one or more of the various embodiments, the source gateway may initiate a connection handshake with a relay computer. As discussed above, in some embodiments, there may be more than one relay computer reachable by the source gateway computer. Accordingly, in such cases, the source gateway computer may be arranged to broadcast the initial handshake packets to all reachable relay computers. Note, in one or more of the various embodiments, the term broadcast is used generally. In some embodiments, a gateway computer may be arranged attempt to reach relay computers via one or more network interfaces, networks, radios, protocols, services, or the like.

For example, if a network or network protocol natively supports a broadcasting, the gateway computer may broadcast the handshake using the native facilities of that network. In other embodiments, the gateway computer may be provided a list of available relay computers by a management platform server, or the like. For examples, policy information provided by a management platform server may include a list of authorized relay computers as well as conditions/rules for accessing them. Note, such information may include network address information, credentials, or the like, that may be required communicate the handshake information.

Further, in some embodiments, relays computers may be accessible over different network interfaces or radios (e.g., localhost, Ethernet, WiFi, BlueTooth, or the like). Accordingly, in one or more of the various embodiments, gateway computers may be arranged to broadcast handshake requests on each individual interface. For example, a gateway computer may be configured to "broadcast" handshake messages to various interfaces, such as, its localhost interface, a WiFi interface, two or more cellular data networks, or the like. Thus, in this example, the underlying broadcast mechanism or protocol may be selected to be consistent with a given interface. In some embodiments, overlay network engines, such as overlay network engine 322 or network routing engines, such as, network routing engine 326 may be arranged to provide a common interface (See, FIG. 5) that transparently formats and sends handshake messages over the various network interfaces, radios, or the like, that may be available to a gateway computer.

In one or more of the various embodiments, gateway computer may be arranged to apply various conditions or rules to determine which relay computer to contact. Also, in some embodiments, gateway computers may be arranged to apply other conditions or rules to determine which answering relay (if any) to employ. For example, in some embodiments, gateway computers may be arranged to accept the first relay computer that provides it a valid response.

Accordingly, in one or more of the various embodiments, a gateway computer that needs a relay computer may be likely to receive a first response from a relay computer that may be best suited to service the gateway computer. For example, since the first response to the gateway computer handshake request is likely to be provided by a relay computer that is closest to the requesting gateway computer. Likewise, in some embodiments, overloaded relay computers may be slower to respond than under-utilized relay computers. Thus, in some embodiments, using a first-to-answer policy for selecting relay computers may automatically provide load or resource balancing that improves the performance of the overlay network.

Accordingly, in one or more of the various embodiments, a handshake may include an initiation request that may be provided to a relay computer from a source gateway computer. In some embodiments, the initiation request may include an "Initiator 1" or "I1" packet, which includes at least and a pair of GIDs, one GID associated with the source gateway computer and one GID associated with the target gateway computer. Network address information, such as, an IP address and a port may be extracted from the sender/source network address information that may be included in the "I1" packet. Subsequent handshake messages may include an ingress identifier (e.g., SPI) value.

For example, if IP networking is being used, the source address of the IP packets sent by the source gateway computer may be used to provide the network address information for the source gateway computer. In this way, the true, an addressable network address (e.g., the IP address and port) of the source gateway computer may be determined by each relay computer that receives the handshake request. In one embodiment, the pair of GIDs, the ingress identifier value, and the network address may be stored in a data object, such as, data object 702.

In one or more of the various embodiments, a relay computer may be arranged to use cryptographic functions to ensure security of the system. However, in some embodiments, cryptographic operations on a per-data-packet basis would limit scalability. Accordingly, in some embodiments, the relay computer may be arranged to verify the signatures of handshake packets, such as "I1". In some embodiments, handshake packets maybe signed by the private key corresponding to the public/private key pair identity for each gateway computer.

At block 908, in one or more of the various embodiments, the target gateway computer may be arranged to establish a connection with the relay computer. In one or more of the various embodiments, gateway computers may be arranged to periodically establish connections to with one or more relay computers to provide them the information necessary for the relay computer to facilitate handshake or connections with other gateway computers in other networks.

Accordingly, in one or more of the various embodiments, an auto-connect request may be provided to one or more relay computers from a target gateway computer. In one embodiment, once a management platform server has published a policy allowing an overlay network connection between two gateway computers, network address information (e.g., IP addresses and ports) need to be determined for both gateway computers. In embodiments where a source gateway computer initiates an initial connection request, the target gateway computer may be arranged to automatically send a connection request so that a relay can coordinate packets between the two. In one embodiment the handshake request from a target gateway computer described in block 908 may be similar to the actions described for block 906—an ingress identifier and network address information may be extracted from the network packet(s) associated with connection from the target gateway computer, while the auto-connect request includes a pair of GIDs defining the source and target gateway computers. The extracted information may be stored in a data object, such as, data object 702.

At block 910, in one or more of the various embodiments, if the connection attempt between the source gateway computer and the target gateway computer is allowed by the current policy, control may flow to block 912; otherwise, control may be returned to a calling process.

In one or more of the various embodiments, a decision is made whether the "I1" (handshake) requests are consistent with the policy provided by the management platform server at block 902. In one or more of the various embodiments, an "I1" request may be considered consistent with policy if the pair of GIDs included in the handshake request appear as a pair in the policy data object, e.g. In columns 610 and 612 of data object 608. In some embodiments, if an initiation request is inconsistent with policy, e.g. if the pair of gateway computers trying to connect are absent data object 608, then the process continues to a return block. Note, in some embodiments, relay computers may be arranged drop or otherwise ignore handshake request network packets that are inconsistent with policy.

Accordingly, in one or more of the various embodiments, if the handshake requests are allowed by policy, then control continues to block 912, where the relay computer may be arranged to forward additional control packets between the source gateway computer and target gateway computer. For example, in some embodiments, the "I1" packets received at block 904 may be forwarded on to the target gateway computer. In one embodiment, the "I1" packet (and any subsequent packets, control or data) may forwarded by replacing source network address information (e.g., IP address and port) with the network address information (e.g., IP address and port) of the relay computer, as well as replacing the destination network address information (e.g., IP address and port) with the network address information associated with the target gateway computer.

At block 912, in one or more of the various embodiments, the relay computer may be arranged to forward control packets to or from the source gateway computer and the target gateway computer. Accordingly, in one or more of the various embodiments, after the connection has been established, data packets may be forwarded between the source gateway computer and target gateway computer. In one embodiment, as discussed above with regard to block 910 above, the data packets may be forwarded by replacing source network address information (e.g. IP address and port) with the network address information (e.g., IP address and port) of the relay computer, as well as replacing the destination network address information (e.g., IP address and port) with the network address information (e.g., IP address and port) of the target gateway computer.

In one embodiment, an overlay network engine may be arranged such that the actual payload traffic between two gateway computers may be typically, but not necessarily, protected with a secure communication protocol, such as, IPsec. Accordingly, GIDs may be used to create IPsec Security Associations (SAs) and to authenticate the gateway computers. If IPsec is used, the actual payload packets remain compatible with standard IPsec-protected IP packets. Thus, in one or more of the various embodiments, they may reliably be used across networks. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system or multi-core computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by one or more hardware microcontrollers instead of a CPU. In at least one embodiment, the one or more microcontrollers may directly execute its own embedded logic to perform actions and access its own internal memory and its own external Input and Output Interfaces (e.g., hardware pins and/or wireless transceivers) to perform actions, such as System On a Chip (SOC), or the like.

FIG. 10 illustrates a sequence diagram 1000 for overlay network identity-based relay in accordance with at least one of the various embodiments. In one embodiment, process 1000 may be implemented by gateway computers, relay computers, node computers, management platform server computers, or the like, as described above.

In this example, sequence 1000 begins with a management platform server sending update policy 902 to gateway computer A. In one embodiment, the policy defines which gateway computers may communicate with each other, and via which relay computers.

In this example, for some embodiments, gateway A sends a handshake request 1004 to a relay computer. The request may include an "I1" initial connection request packet for establishing a connection to gateway computer B. In one embodiment, the initial connection request packet may be sent in response to receiving an updated policy from a platform engine or management platform server.

Next, in this example, the relay computer may be arranged to check for a policy 1006 corresponding to the handshake request. Specifically, the relay extracts the source GID and the target GID included in the initial connection request packet and looks for a policy in a data object, such as, data object 602 that includes this pair of GIDs. However, in this example, since the relay has not received an updated policy, initialization request 1004 is dropped. Eventually, after some number of retries, gateway computer A will determine that initialization request 1004 was dropped or otherwise rejected by the relay computer. In this scenario, gateway computer A may attempt to generate handshake request packet to resend a later time, after the relay computer has had a chance to receive an updated policy.

Next, in this example, a management platform server may distribute an updated policy 1008 to the relay computer. In this example, the updated policy may be considered the same policy received already by gateway computer A. In one embodiment, GID pairs found in the updated policy may be used to populate policy data objects such as data object 602.

Next, in this example, Initialization request 1010 may be transmitted from gateway computer A to the relay computer. This request is similar to, if not identical to, Initialization request 1004. However, in the intervening time, the relay computer may be considered to have its policy updated, and so now the policy check for the GIDs contained in initialization request 1010 succeeds.

However, in this example, the check for network address 1012 does not succeed, as the relay has yet to receive an "auto connect" initial connection request from gateway computer B, and as such the relay computer does not know the ingress identifier or network address information of gateway computer B. Consequently, initialization request 1010 is dropped or otherwise rejected by the relay computer. In this scenario, gateway computer A may attempt to generate another initial connection request packet to resend at a later time.

Next, in this example, the management platform server may transmit updated policy 1014 to gateway computer B. The updated policy may be considered to be the same policy received already by gateway computer A and the relay.

In response to update policy 1014, gateway computer B may initiate an auto connect 1016 to provide connection information to the relay computer. In some embodiments, auto connect 1016 may include information that indicates a pair of gateway computers that may be allowed to communicate with each other. For example, GIDs associated with gateway computer A and gateway computer B may be extracted from the network traffic associated with auto connect 1016. The relay computer may also obtain the ingress identifier, source gateway computer network address information and store the resulting data in a policy data object such as data object 602.

Next, in this example, gateway computer A may transmit initial connection request packet 1018 to the relay computer. At this point, in this example, policy exists to allow gateway computer A to connect with gateway computer B. Also, the network address information has been extracted for gateway B, and so the previous conditions 1006 and 1012 are satisfied. As such, an ingress identifier and source network address information may be obtained from connection request 1018 and stored in a data object, such as, data object 602. At this point, ingress identifiers and network address information have been obtained and stored in data object 602.

Next, in this example, the initial connection request packet 1018 may modified to create initial connection request packet 1020. Specifically, in this example, source network address information may be overwritten with the network address information associated with the relay computer. Similarly, a destination network address information may be overwritten with the network address information associated with the target gateway computer. Next, initial connection request packet 1020 may be forwarded to gateway computer B. Gateway computer B may, in one embodiment, respond with an "r1" packet, short for "responder1".

Next, in this example, control traffic may be forwarded between gateway computer A and gateway computer B. This control traffic may include, for example, an "Initiator 2" packet and a "responder 2" packet, after which a four part handshake has been completed and the connection is activated.

Next, in this example, data traffic 1024 may be forwarded between gateway computer A and gateway computer B. Accordingly, the target gateway computer may forward the traffic to the appropriate node computer. In some embodiments, the data traffic may include ESP (Encapsulating Security Payload) traffic.

In one embodiment, network traffic sent and received from gateway computer A may use one network address standard, such as, Internet Protocol version 4 ("IPv4"), while packets sent and received from gateway computer B may use a different network addressing scheme, such as, Internet Protocol version 6 ("IPv6"). In one embodiment, forwarding control traffic or data traffic between gateway computer A and gateway computer B may include the relay computer translating between the different network addressing conventions or standards. For example, in some embodiments, a relay computer may be arranged to translate IPv4 packets to and from IPv6 packets, without encapsulating one packet within another.

In one or more of the various embodiments, if data traffic 1024 has ceased or at least paused for a long time, keep-alive packets 1026-1032 may be exchanged to keep a connection between gateway computer A and gateway computer B open. However, if data traffic should begin again over the connection, the transmission of keep-a-lives packets may cease because they may be unnecessary.

Next, in this example, the relay computer may become unreachable 1034. In some embodiments, this may be due to one or more errors conditions, such as, network failure, network misconfigurations, user errors, equipment failures, power outages, or the like, or combination thereof.

Accordingly, In one or more of the various embodiments, after the relay computer becomes unreachable, both gateway computer A and gateway computer B may be arranged to continue to send keep-alive packets 1036 through 1044. For example, in one embodiment, relay computer or gateway computers may be arranged to send keep-alive packets every 15 seconds for 45-60 seconds. If, as depicted in FIG. 10, the keep-alive packets are not acknowledged the relay computer, one or both of gateway computer A or gateway computer B may attempt to reconnect to other relay computers 1050, beginning the described sequence once again starting at Update Policy 1002.

What is claimed as new and desired to be protected by Letters Patent of the United States is:

1. A method for managing communication over a network using a plurality of network computers, wherein execution of instructions by one or more network computers performs the method comprising:
   determining a connection route for one or more received packets based on a source identifier corresponding to a source network computer and a target identifier associated with a target network computer, wherein the connection route is associated with both the source identifier and the target identifier, and wherein each identifier is separate from a network address of the source network computer or the target network computer, and wherein the source network computer and the target network computer provide one or more of security, access control, or routing for the one or more packets; and
   forwarding the one or more packets provided by the source network computer to the target network computer based on network address information associated with the target network computer.

2. The method of claim 1, further comprises:
   one or more data objects that include one or more lists of pairs of network computers that are authorized to establish a connection with each other, wherein the one or more lists are employed with one or more policies to restrict connections between one or more portions of the plurality of network computers.

3. The method of claim 1, further comprises:
   employing the source identifier and the target identifier to authenticate the source network computer and authenticate the target network computer; and
   employing the source identifier and the target identifier to establish a secure communication protocol for a connection between the authenticated source network computer and the authenticated target network computer.

4. The method of claim 1, wherein the forwarding of the one or more packets further comprises relaying the one or more packets over an identity based overlay network.

5. The method of claim 1, wherein one or more of the source network computer or the target network computer is arranged as a gateway on the network.

6. The method of claim 1, wherein determining the connection route further comprises:
   employing an ingress identifier to determine the connection route, wherein the ingress identifier is separately obtained from the source network computer than the source identifier.

7. The method of claim 1, further comprising:
   employing one or more overlay networks to be separately configured from one or more configurations of one or more node computers that are included in the one or more overlay networks.

8. A system for managing communication over a network, comprising:
   a network computer, comprising:
      a memory that stores at least instructions; and
      one or more processors that execute instructions that perform actions, including:
   determining a connection route for one or more received packets based on a source identifier corresponding to a source network computer and a target identifier associated with a target network computer, wherein the connection route is associated with both the source identifier and the target identifier, and wherein each identifier is separate from a network address of the source network computer or the target network computer, and wherein the source network computer and the target network computer provide one or more of security, access control, or routing for the one or more packets; and
   forwarding the one or more packets provided by the source network computer to the target network computer based on network address information associated with the target network computer.

9. The system of claim 8, further comprises:
   one or more data objects that include one or more lists of pairs of network computers that are authorized to establish a connection with each other, wherein the one or more lists are employed with one or more policies to restrict connections between one or more portions of the plurality of network computers.

10. The system of claim 8, further comprises:
    employing the source identifier and the target identifier to authenticate the source network computer and authenticate the target network computer; and
    employing the source identifier and the target identifier to establish a secure communication protocol for a connection between the authenticated source network computer and the authenticated target network computer.

11. The system of claim 8, wherein the forwarding of the one or more packets further comprises relaying the one or more packets over an identity based overlay network.

12. The system of claim 8, wherein one or more of the source network computer or the target network computer is arranged as a gateway on the network.

13. The system of claim 8, wherein determining the connection route further comprises:
    employing an ingress identifier to determine the connection route, wherein the ingress identifier is separately obtained from the source network computer than the source identifier.

14. The system of claim 8, further comprising:
    employing one or more overlay networks to be separately configured from one or more configurations of one or more node computers that are included in the one or more overlay networks.

15. A processor readable non-transitory storage media that includes instructions for managing communication over a network, wherein execution of the instructions by the one or more network computers perform the method comprising:

determining a connection route for one or more received packets based on a source identifier corresponding to a source network computer and a target identifier associated with a target network computer, wherein the connection route is associated with both the source identifier and the target identifier, and wherein each identifier is separate from a network address of the source network computer or the target network computer, and wherein the source network computer and the target network computer provide one or more of security, access control, or routing for the one or more packets; and forwarding the one or more packets provided by the source network computer to the target network computer based on network address information associated with the target network computer.

16. The processor readable non-transitory storage media of claim 15, further comprises:

one or more data objects that include one or more lists of pairs of network computers that are authorized to establish a connection with each other, wherein the one or more lists are employed with one or more policies to restrict connections between one or more portions of the plurality of network computers.

17. The processor readable non-transitory storage media of claim 15, further comprises:

employing the source identifier and the target identifier to authenticate the source network computer and authenticate the target network computer; and employing the source identifier and the target identifier to establish a secure communication protocol for a connection between the authenticated source network computer and the authenticated target network computer.

18. The processor readable non-transitory storage media of claim 15, wherein the forwarding of the one or more packets further comprises relaying the one or more packets over an identity based overlay network.

19. The processor readable non-transitory storage media of claim 15, wherein determining the connection route further comprises:

employing an ingress identifier to determine the connection route, wherein the ingress identifier is separately obtained from the source network computer than the source identifier.

20. The processor readable non-transitory storage media of claim 15, further comprising:

employing one or more overlay networks to be separately configured from one or more configurations of one or more node computers that are included in the one or more overlay networks.

* * * * *